(12) United States Patent
Sankavaram et al.

(10) Patent No.: US 11,489,839 B2
(45) Date of Patent: Nov. 1, 2022

(54) AUTOMATIC USER PERMISSION REFINEMENT THROUGH CLUSTER-BASED LEARNING

(71) Applicant: salesforce.com, inc., San Francisco, CA (US)

(72) Inventors: Sneha Krishna Sankavaram, San Francisco, CA (US); Hui Fung Herman Kwong, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 739 days.

(21) Appl. No.: 16/264,624

(22) Filed: Jan. 31, 2019

(65) Prior Publication Data

US 2020/0252405 A1 Aug. 6, 2020

(51) Int. Cl.
*H04L 9/40* (2022.01)
*G06F 16/955* (2019.01)
*G06K 9/62* (2022.01)
*G06N 20/00* (2019.01)

(52) U.S. Cl.
CPC .......... *H04L 63/102* (2013.01); *G06F 16/955* (2019.01); *G06K 9/6223* (2013.01); *G06N 20/00* (2019.01)

(58) Field of Classification Search
CPC .......... H04L 63/102; G06F 2221/2141; G06F 16/955; G06F 21/62; G06N 20/00; G06K 9/6223
USPC ......................................................... 706/12
See application file for complete search history.

(56) References Cited

U.S. PATENT DOCUMENTS

| | | | |
|---|---|---|---|
| 8,166,560 B2* | 4/2012 | Chebolu | H04L 63/102 726/27 |
| 8,484,140 B2* | 7/2013 | Thompson | G06N 5/022 706/12 |
| 2010/0287129 A1* | 11/2010 | Tsioutsiouliklis | G06F 16/951 706/46 |
| 2015/0142707 A1* | 5/2015 | Charif | G06N 20/00 706/12 |
| 2018/0341778 A1* | 11/2018 | Florentino | G07C 9/00571 |
| 2019/0179796 A1* | 6/2019 | Lakhman | G06F 16/5838 |

* cited by examiner

*Primary Examiner* — Umar Cheema
*Assistant Examiner* — John Fan
(74) *Attorney, Agent, or Firm* — Wong & Rees LLP; Kirk D. Wong

(57) ABSTRACT

Clustering-based machine learning is utilized to generate and update permissions data in a computing system. The computing system logs permissions-related user activity for users of the system over time. Feature vectors are generated for the users based on the logs, where each feature corresponds to a specific permission or permission-related operation of the system. A clustering-based learning algorithm analyzes the feature vectors and generates clusters of similar users based on their feature vectors. The permissions of the users may be updated to reflect attributes of the clusters to which they were assigned. For example, the clusters may be utilized to seed and/or update access control groups or other permissions-related user groups in the system. Or, some or all permissions not used by any users within a cluster over a recent period of time may be automatically removed from any user in the cluster.

20 Claims, 5 Drawing Sheets

AUTOMATIC USER PERMISSION REFINEMENT THROUGH CLUSTER-BASED LEARNING

TECHNICAL FIELD

Embodiments relate generally to managing user access permissions, and, more specifically, to techniques for automatically adjusting permission data via cluster-based learning.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer systems typically implement some form of access control, via which access to certain types of operations is granted or denied depending on permissions associated with a user who is requesting the operations. Depending on the system, permissions may govern access to anything from individual file editing operations to operations of large-scale distributed computing applications. Permissions can be assigned to users at an individual level, or permissions can be assigned to groups. In the latter case, the permissions of a user are a function of the group or groups to which the user belongs.

Users may have varying levels of permissions depending on their role within an organization that operates the computer system. For instance, an IT employee might have permissions to access to different applications and/or operations within those applications than an administrative assistant or a vice president. In this manner, among other aspects, the computer system reduces the risk of security breaches whereby untrained or rogue employees, computer viruses or other malware, malicious hackers, or other entities gain unauthorized access to the information in and/or functions of the computing system and inadvertently or deliberately take actions that damage the system and/or the organization.

As an organization develops and grows over time, the complexity of the computing system tends to grow as well. Additional applications, operations, and permissions may be added to the system. Furthermore, the roles and needs of various users may change over time. It can be difficult to plan the permissions of hundreds, thousands, or even millions of users at any instant of time, much less react to changes over time. Because of this complexity, users are often assigned a greater number of permissions than needed. Moreover, users often retain permissions that were needed in a previous role but are no longer needed. Consequently, the computing system is exposed to greater security risks than is desirable.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
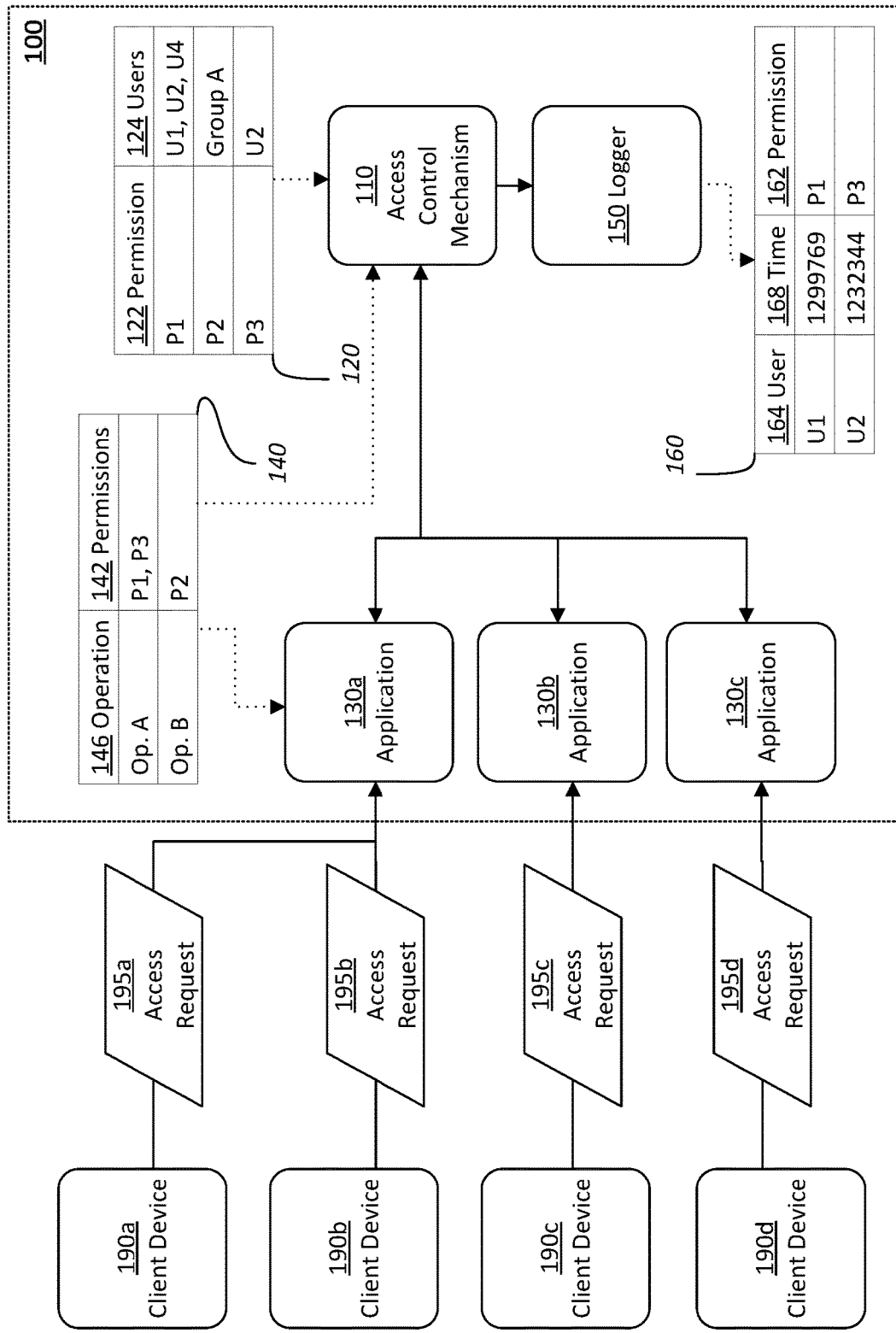
FIG. 1 is an illustrative view of various aspects of an example system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Applications
2.2. Client Devices
2.3. Access Control Mechanism
2.4. Operation Permission Data
2.5. Logger
2.6. Feature Vector Generation
2.7. Clustering Algorithm
2.8. Cluster Permission Resolver
3.0. Functional Overview
4.0. Example Embodiments
5.0. Implementation Mechanism-Hardware Overview
6.0. Extensions and Alternatives

1.0. General Overview

Approaches, techniques, and mechanisms are disclosed for utilizing clustering-based machine learning to generate and update permissions data in a computing system. The computing system logs permissions-related user activity for users of the system over time. Feature vectors are generated for the users based on the logs, where each feature corresponds to a specific permission or permission-related operation of the system. A clustering-based learning algorithm analyzes the feature vectors and generates clusters of similar users based on their feature vectors. The permissions of the users may be updated to reflect attributes of the clusters to which they were assigned.

For example, in an embodiment, the clusters may be utilized to seed and/or update access control groups or other permissions-related user groups in the system. As another example, in an embodiment, some or all permissions not used by any users within a cluster over a recent period of time may be automatically removed from any user in the cluster. As yet another example, in an embodiment, some or all permissions used by users in a cluster may be automatically added to other users in the cluster who do not already have the permissions.

In an embodiment, the value of a feature in a feature vector reflects whether use of the corresponding permission or operation was logged for the user in a recent period of time. In an embodiment, the value of a feature in a feature vector reflects how frequently usage of the corresponding permission or operation was logged for the user in a recent period of time.

In an embodiment, permissions data utilized by an access control mechanism within the system may be updated automatically based on periodic applications of the cluster-based learning algorithm to user activity logs. In an embodiment, the cluster-based learning algorithm may instead be utilized to generate recommendations to a system administrator, who then investigates whether the changes are desirable, and implements the changes if needed.

In other aspects, the inventive subject matter encompasses computer apparatuses and computer-readable media configured to carry out the foregoing techniques.

2.0. Structural Overview

FIG. 1 is an illustrative view of various aspects of an example system 100 in which the techniques described herein may be practiced, according to an embodiment. System 100 is an example of a system configured to use permissions data to control access to system operations, according to an embodiment. In other embodiments, such a system may include fewer or additional elements, in varying arrangements.

System 100 comprises one or more computing devices. These one or more computing devices comprise any combination of hardware and software configured to implement the various logical components described herein, including components 110-160. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In an embodiment, system 100 is a server-based system comprising one or more server devices configured to communicate with client devices, such as client devices 190, over one or more networks, including the Internet, intranets, virtual private networks, and so forth. The one or more server devices may be, for instance, computers configured to execute logic for web servers, database servers, application servers, and/or any other types of servers. In an embodiment, system 100 is a distributed, multi-tenant enterprise application system comprising multiple, geographically separated data centers collectively configured to work together in one or more clusters to provide the functions described herein. In yet other embodiments, system 100 may be a single data center, or even a single computing device.

Though not depicted, system 100 may comprise any suitable set of other components necessary to provide the functionality described herein, such as network switches, routers, and/or other networking devices, storage systems, memories, and so forth.

2.1. Applications

System 100 is configured to execute various applications 130, such as the depicted applications 130a-c. As used herein, an application 130 is a set of program logic for performing a distinct set of operations in the system 100, also referred to as tasks or functions. System 100 may support any number of applications 130, including, in an embodiment, just a single application 130. Examples of applications 130 include, without limitation, web applications, database applications, shell-based applications, remote desktop applications, messaging applications, workflow applications, word processing applications, or any other application. In an embodiment, in addition to specific programs running on a server, the servers themselves may separately be considered applications 130, including database servers, file servers, web servers, enterprise application servers, email servers, video streaming servers, virtual private network ("VPN") servers, or other types of servers. In an embodiment, an operating system itself may function as an application 130.

The operations performed by applications 130 may include any task capable of being performed by a computer, including, without limitation, querying data, reading a file, writing a file, displaying information from files or databases, storing new data, manipulating files or databases, manipulating application configurations, sending messages, processing data, restarting a server, executing a remote process, and so forth. An application 130 may perform any number of tasks, including just a single task, depending on the application 130.

Generally, applications 130 are configured to perform these operations in response to inputs from client devices 190, such as the depicted devices 190a-d. Because these inputs may be generally characterized as requesting access to the operations of the applications 130, these inputs are referred to herein as access requests 195, such as the depicted requests 195a-d.

Access request 195 may take a variety of forms, such as Hyper-Text Transport Protocol ("HTTP") requests, Application Programmatic Interface ("API") calls, database requests such as SQL queries, file requests, shell-based communications, and so forth.

In an embodiment, some or all of access requests 195 target a specific Uniform Resource Indicator ("URI"), file identifier, pathname, etc., by which system 100 determines the application 130 to direct the request 195 to, and by which the targeted application 130 further determines which operation(s) to perform. A request 195 may request a single operation, or in some embodiments, certain requests 195 may request performance of multiple operations.

For instance, in an embodiment, an application 130 may be a web application. A client device 190 may send a first request 195 to access a control panel for the web application. In response to this request, the application 190 may perform the operation of generating and returning a web page depicting a control panel. This control panel may have various interfaces by which one may request to reconfigure the web application. For instance, a user may click on a button in the control panel to issue a command to the web application to begin operating in a certain mode. In response, the client device 190 may send a second request 195 to the web application to perform the operation of reconfiguring itself to execute in the certain mode.

2.2. Client Devices

The client devices 190 may be any suitable types of computing devices that are communicatively coupled to system 100, such as via one or more networks. The client devices 190 may include, for example, and without limitation, desktop computers, portable computing devices, smartphones, remote server systems, and so forth. A client device 190 may operate one or more client applications configured to communicate with system 100.

In some cases, a client application may be configured to access a specific application 130 in system 100. For instance, the client application may be a smartphone app that is hard-coded to communicate with a specific application on the system 100, or at least hard-coded to only communicate with a specific type of application. As another example, the client application may be a data analysis or reporting application, configured to query a database in the system 100.

In other cases, the client application may be configured to communicate with a fixed set of applications 130, with each application providing a different set of functions to the client application. In yet other cases, the client application may be a more general-purpose client application, such as a general-purpose web browser, that can freely communicate with multiple applications 130 in system 100.

2.3. Access Control Mechanism

System 100 comprises an access control mechanism 110 configured to control which client devices 190 may access which operations of applications 130. Access control mechanism 110 may take a variety of forms, depending on the embodiment. For instance, in simple embodiments, access control mechanism 110 is simply a file or database that various applications 130 may read to determine permissions for users. In other embodiments, access control mechanism 110 may be logic having various levels of complexity. For instance, access control mechanism 110 may be a distinct access control server or rights management server within system 100 that applications 130 are configured to communicate with. Or, access control mechanism 110 may be a module, framework, or other component within an operating system, server system, or other platform on which applications 130 execute.

Generally, access control mechanism 110 facilitates access to user permissions data 120 stored within system 100. User permissions data 120 maps enumerated permissions 122 to specific users 124. Permissions 122 may be broad, general permissions, such as "read," "write," "view," and so forth. Or, permissions 122 may be more specific, such as "view page x in application y" or "change x configuration." In an embodiment, permissions 122 may be specifically associated with files or URIs, each of which may have one or more required permissions.

Users 124 may be specified in a variety of manners. For instance, a permission may be mapped specifically to a single user, to an enumerated set of users, or to a specific group of users (e.g. an "access control group").

Although depicted as a simple two-columned table, user permissions data 120 may in fact take a variety of forms, such as a relational database with several layers of indirection. For instance, permissions data 122 may contain a mapping of a set of permissions 122 to a profile, a mapping of a profile to a set of user groups, a mapping of a set of user groups to a set of users, etc. Moreover, instead of mapping a permission to a set of users, the format of user permission data 120 may be inverted so as to map a set of permissions to a user or group of users.

In an embodiment, applications 130, or other server logic within system 100, are communicatively coupled to access control mechanism 110 such that they may look up or query for information indicating whether a user is associated with a certain permission. An application 130 may, for instance, make an API call or other suitable request to access control mechanism 110 for all permissions 122 associated with a user 124 when the user 124 logs into the application 130. The access control mechanism 110 may return the permissions 122 currently associated with the user 124 in permissions data 120, or at least a set of permissions 122 deemed relevant to the requesting application. Or, an application 130 may specifically request whether a user 124 has a specified permission 122 any time the application 130 needs to determine whether the user 124 has the specified permission 122. The access control mechanism 110 may return an indication of whether or not the user 124 has the specified permission.

Optionally, the access control mechanism may include a user account subsystem, or such a subsystem may be a separate component of system 100. The user account subsystem may include, among other aspects, user account records as well as credential verification data. When a client device 190 initiates communication with system 100, and/or at various subsequent times, an application 130, or other server logic within system 100, may receive credential data from the client device 190 and interact with the user account subsystem to verify the credential data. If the credentials can be verified, the user account subsystem "logs" a user associated with credentials in to the system 100 and associates that user with the client device 190 (e.g. using session data, authentication keys, or other suitable mechanisms). Access requests 195 originating from that client device 190 may thereby be recognized as being associated with, or "from," the logged in user.

Although not depicted, access control mechanism 110 may also include a configuration mechanism by which user permissions data 120 may be updated. For instance, the access control mechanism 110 may include a graphical user interface, API, or command line interface by which permissions 122 may be added to a user 124 or group of users 124. As another example, the interface may also or instead permit associating a user 124 with a group. In some embodiments, user permissions data 120 may be edited directly without the involvement of access control mechanism 110.

2.4. Operation Permission Data

As indicated, some or all of the operations performed by an application 130 may be associated with specific permissions. In order for the application 130 to perform such operations, the access request 195 that requests an operation must be associated with, or "from," a user who has the permission or permissions associated with the operation. Depending on the embodiment and/or application 130, permissions may be granted on an operation-by-operation basis, or operations may be grouped together, and permissions may be associated with the group of operations.

In embodiments where there is not a one-to-one correspondence between permissions and operations, operations permission data 140 may be maintained. Operation permission data 140 maps an operation 146 to a specific set of permissions 142. Permissions 142 may correlate to permissions 122. An operation 146 might require a single permission 142, or combination of permissions 142, or at least one permission in a set of permissions 142.

As an example, in the operation-by-operation case, a client device such as client device 190b may log in to an application such as application 130b. Subsequently, the client device 190b may send an access request 195b to access a specific operation to the application 130b. The application 130b may then query the access control mechanism 110 to determine whether the user associated with the access request 195b has a permission 122 to access the operation. As an alternative, the application 130b may have already queried the access control mechanism for a user profile when the user 124 first logged on, and the user profile may have included an indication of whether the user had the relevant permission 122.

In an embodiment, permissions may be granted on an application-by-application basis. Accessing an application may thus be considered a single operation. Before allowing a client device 190 access to an application such as application 130c, server logic within system 100, or application logic within the application 130c, may query the access control mechanism 110 to determine whether the user 124 associated with the relevant access request 195 has permission to access the application 130c. If so, the application 130c may respond to the access request 195. If not, then either no response is given, or a response indicating lack of access is returned.

In an embodiment, an application 130 may simply request whether a specified user has the requisite permissions to perform a specified operation. Access control mechanism 110 may look up the permissions needed for the specified operation in operation permissions data 140, determine whether the specified user has the permissions, and respond to the application 130 with an indication of whether the specified operation may be executed.

In an embodiment, the access control mechanism 110 may not necessarily maintain operations permission data for every possible operation. Instead, an application 130 may maintain separate operation permission data 140 that maps an operation 146 to a specific set of permissions 142. For example, a client device 190a may log in to application 130a. Subsequently, the client device 190a may send an access request 195a to access a specific operation A to the application 130a. The application 130a may look up the operation A in its operation permission data 140 and determine that permissions P1 and P3 are required for operation A. The application 130a may therefore query the access control mechanism 110 to determine whether the user 124 associated with the access request 195a has the necessary permissions P1 and P3. Or, the application 130a may have, in the alternative, loaded a profile of the user's permissions up front.

2.5. Logger

System 100 further includes a logger 150. Logger 150 is a server, module, framework, or any other suitable logic within system 100 configured to maintain logs of various data. The logger 150 may collect logs of a variety of information, but of most relevance to this disclosure are user activity logs 160. The user activity logs 160 indicate specific permissions 162 that have been utilized for specific users 164 at specific times 168. Permissions 162 correlate to permissions 122, while users 164 are specific users to whom permissions 122 are mapped. The time 168 may be recorded in any form and at any level granularity.

The user activity logs 160 may specifically log the use of a permission 162, or may indicate the use of a permission 162 indirectly. In the former case, for example, the logger 150 may be communicatively coupled to access control mechanism 110. When an application 130, or other logic within system 100, sends a request to access control mechanism 110 asking whether a user has a specified permission, the access control mechanism 110 may send a message to logger 150 indicating the time 168, user 164, and permission 162 associated with the request. In an embodiment, the access control mechanism 110 may do so for all requests, in which case the access control mechanism may also instruct the logger 150 to log an indication of how the access control mechanism 110 responded, or the access control mechanism 110 may only ask the logger 150 to log instances when the relevant user 164 actually had the relevant permission 162. In yet other embodiments, an application 130 may instead instruct the logger 150 to record the use of a permission 162.

In an embodiment, the user logs 160 may additionally or instead indicate the use of a permission indirectly by logging executed operations instead of permissions. For instance, any time an application 130 executes an operation, the application 130 may send a message to logger 150 to record an operation identifier (e.g. a URI), a user 164, and a time 168. Alternatively, request handling logic within the system may be configured to receive all access requests 195 and determine the relevant application 130 to which each request 195 should be forwarded. For each request, the request handling logic may instruct the logger 150 to record a URI and/or other operation identifying information. In either case, though not necessary in certain embodiments, subsequently, the permission or permissions 162 associated with that operation may subsequently be looked up to determine what permission 162 was actually exercised.

Although depicted as a table, user activity logs 160 may take the form of a relational database or any other suitable form in any suitable storage mechanism. User activity logs 160 may include a variety of data in addition to that depicted, such as client identifiers, IP addresses, and so forth. Individual entries in the user activity logs 160 may be kept in perpetuity, or deleted after a period of time, depending on the embodiment. In an embodiment, applications 130 and/or access control mechanism 110 may write user activity logs 160 directly, instead of requiring a distinct logger component 150.

2.6. Feature Vector Generation

Figure 2:
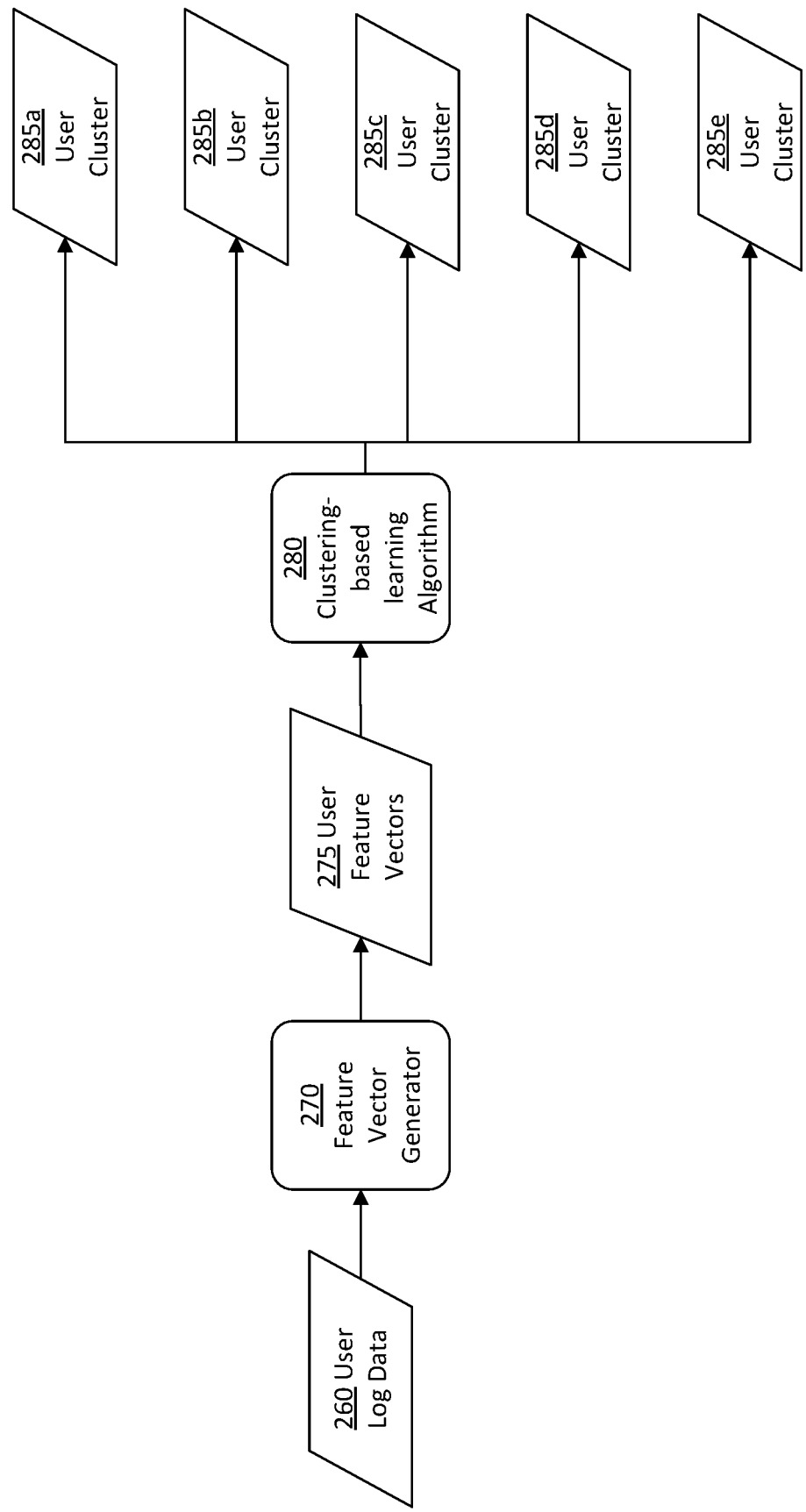
FIG. 2 illustrates an example permissions-based user clustering subsystem.

FIG. 2 illustrates an example permissions-based user clustering subsystem 200, according to an embodiment. Subsystem 200 is but one example of a permissions-based user clustering subsystem 200, and other such systems may include fewer or additional elements in varying arrangements. In an embodiment, subsystem 200 is a subsystem of system 100, though in other embodiments subsystem 200 may be a component of any other system configured to utilize permissions data to control access to operations. In an embodiment, subsystem 200 may be an external system, communicatively coupled to a system configured to utilize permissions data to control access to operations.

Subsystem 200 includes a feature vector generator component 270. Feature vector generator 270 is configured to input user log data 260. The user log data 260 may be, for example, user activity log data 160 from system 100, or any other log of permissions and/or operations that have been utilized by users. Feature vector generator 270 is then configured to process the user log data 260 in such a manner as to generate user feature vectors 275. Feature vector generator 270 may generate a user feature vector 275 for each user whose activity is logged in user log data 260, or for a subset thereof.

A user feature vector 275 is an array of values, each of which represents a different feature. Each feature corresponds to some aspect of the corresponding user's historical usage of a permission. The feature vector 275 may take various forms, depending on the embodiment, and some examples of suitable feature vectors 275 are now described.

In some embodiments, features are permission-based, in that there is a one-to-one correspondence between features and permissions. That is to say, each available permission—for instance, each permission 122 in user permission data 120—has a feature in the vector 275. The first value in the vector 275 corresponds to a first permission/feature, the second value in the vector 275 corresponds to a second permission/feature, and so forth.

In an embodiment, the value of a feature simply reflects whether the user has used the corresponding permission. Hence, if the user log data 260 includes an entry that indicates, either directly or indirectly, that the permission was used, the feature vector generator 270 would set the value of the feature to be 1, whereas the feature vector generator 270 would set the value of the feature to be 0 otherwise.

In an embodiment, the value of a feature reflects the number of times a user has used the corresponding permission. Hence, if the user log data 260 includes three entries that indicates that the permission was used, the feature vector generator 270 would set the value of the feature to be 3, whereas the feature vector generator 270 would set the value of the feature to be 1 if there was only one entry that indicates that the permission was used.

In an embodiment, for the purposes of generating the feature vector, the feature vector generator 270 may restrict the user log data 260 to a period of time, such as a month, year, or any other suitable range of time. In an embodiment, the feature vector generator may set the value of a feature lower the less recently the corresponding permission was used. For instance, if the user data 260 indicates that a permission was used most recently within the last month, feature vector generator 270 might set its corresponding feature value to 1, whereas if the user data 260 indicates that a permission was used most recently a year ago, feature vector generator 270 might set its corresponding feature value to 0.2.

In an embodiment, the value of a feature may be a score calculated based on both the frequency of permission use as well as the recency of that use. For instance, a log entry that reflected permission use within the last month might add a value of one to the score, whereas a log entry that reflected permission use three months ago might add only 0.5 to the score.

In some embodiments, features may instead be operation-based features that correspond to access operations logged in the user log data 260, such as accessing a specific application or URI, or specific operations performed by an application. As with embodiments where the features represent permissions, the logic by which the value of the feature is calculated from the logged operations varies depending on the embodiment. For instance, the value of a feature may be a count of the number of times the operation was logged for the user, or simply a binary indicator of whether or not the operation was logged for the user. Similarly, the value may be a score that reflects the recency and/or frequency with which the operation was logged for the user.

In an embodiment, features may be tool-based. A tool may correspond to a specific set of operations. A tool may include operations from one or more applications, and/or an application may provide access to one or more tools. In an embodiment, the feature vector generator component 270 may set the value of a tool-based feature based on whether an operation or permission associated with that tool was logged for the user in the user log data 260. In an embodiment, the user log data 260 may simply log the use of a tool rather than the use of specific operations or permissions associated therewith. In either event, the value of a tool-based feature may be set based on the frequency and/or recency of entries in the user log data 260 in similar manner to permission-based features or operation-based features.

In an embodiment, permission-based features, operation-based features, tool-based features, and/or other features may be utilized within the same feature vector.

2.7. Clustering Algorithm

The user features vectors 275 generated by feature vector generator 270 are inputted into a clustering-based learning algorithm 280. Clustering-based learning algorithm 280 is configured to analyze the feature vectors 275 and assign the feature vectors 275 to different clusters 285 (depicted as user clusters 285a-e) based on the analysis. The clustering-based learning algorithm 280 outputs information identifying the user clusters 285, which in essence maps users found in the user log data 260 to specific groups of users with similar usage patterns.

Clustering-based learning algorithm 280 may be any of a variety of unsupervised machine learning algorithms configured to analyze a set of feature vectors and assign those feature vectors to clusters of similar feature vectors based on the analysis. Clustering-based learning algorithm 280 is executed by machine-learning hardware, or a combination of machine learning hardware and software, within subsystem 200.

According to an embodiment, the clustering-based learning algorithm 280 is a centroid-based clustering algorithm, such as k-modes clustering or k-means clustering. Generally, the centroid-based algorithm selects a number ("k") of centroids within the vector space of the feature vectors 275 and places each feature vector 275 in a cluster corresponding to the centroid that is closest to the feature vector 275. The selection is performed for a number of iterations, adjusting the centroids based on various criteria (e.g. based on previous iterations, randomly, using some pattern, etc.).

For each iteration, the quality of the set of clusters outputted in that iteration produced may be quantified. To quantify the quality of a set of clusters, the set of clusters may be scored using any suitable metric(s) and function(s), including without limitation, average distance of feature vectors 275 from their closest centroid, the squared distances of feature vectors 275 from clusters, how closely a cluster or subset of the clusters matches a certain pre-defined user group or groups, and so forth. The highest scoring (or lowest scoring, depending on the embodiment) set of clusters is said to have the highest, or best, quality.

The iterations may be repeated a set number of times, in which case the set of clusters having the highest quality is output from the clustering algorithm. Or, the iterations may be performed until arriving at a set of clusters that meets some optimization criteria, such as a quality level above some threshold, or a certain percentage of the clusters matching some predefined grouping of users. The final set of clusters is then output from the clustering algorithm.

For clustering algorithms that generate a fixed number of clusters, such as k-modes or k-means (where "k" is the number of clusters to generate), the number of clusters to generate may be specified and adjusted by an operator of the subsystem 200 for various reasons. Or, the number of clusters to create may be selected based on an ideal number of groups of users (e.g. the number of expected user groups within an organization, the number of departments within an organization, the number of job types, etc.). In another embodiment, the clustering algorithm is repeated a number of times with different values of k, and the highest quality set of clusters produced by the clustering algorithm over the course of the repetitions is selected.

According to an embodiment, a modified k-modes clustering algorithm is used. The distance between two vectors (either two vectors 275, or a vector 275 and a centroid) is a Hamming distance, which is a measure of the number of positions at which the corresponding features in the vectors are different. The magnitude (e.g. frequency or score) of the difference between the values of a feature may further be considered with the distance, in some embodiments. In an embodiment, a distance metric can be defined in order to convert membership in a group from categorical to numeric data. One possible way to do this is by constructing a tree and using first common parent node level as the definition of "distance."

Of course, any suitable centroid-based clustering algorithm may be selected, and not just k-modes or k-means. Moreover, other clustering-based learning algorithms may be utilized instead. The chosen algorithm may produce strict clusters 285, where each feature vector 275 belongs to exactly one cluster 285, or overlapping clusters 285, where a feature vector 275 may belong to multiple clusters 285.

2.8. Cluster Permission Resolver

Once user clusters 285 have been identified, they may be utilized for a variety of purposes. For instance, in an embodiment, the user clusters 285 may be used to identify and set access control groups. By this process, the access control groups may be seeded and/or periodically updated. As new users join the system in which subsystem 200 is implemented, they may be added to the access control group(s) to which others in similar roles have been added.

Figure 3:
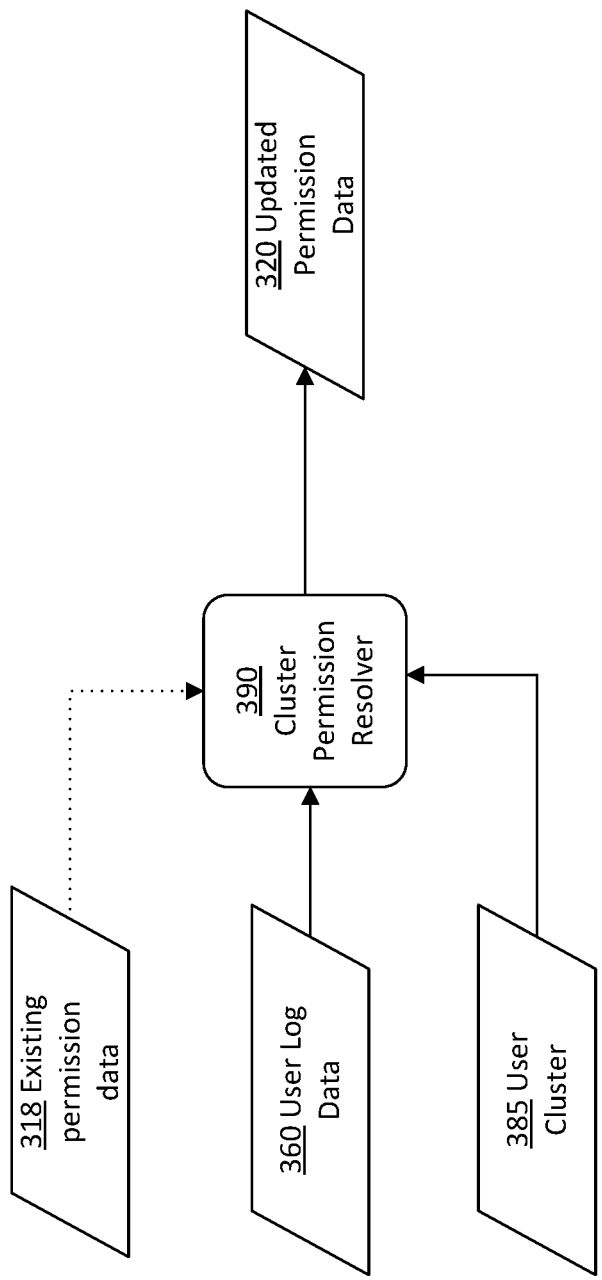
FIG. 3 illustrates an example cluster permission resolution subsystem.

In another embodiment, the user clusters 285 may be utilized to automatically set and/or update permissions for users and/or groups of users. For example, FIG. 3 illustrates an example cluster permission resolution subsystem 300, according to an embodiment. Subsystem 300 is but one example of a cluster permission resolution subsystem 300, and other such systems may include fewer or additional elements in varying arrangements. In an embodiment, subsystem 300 may be utilized in conjunction with subsystem 200, though subsystem 200 may also be utilized without the specific details of subsystem 300, and vise versa.

Subsystem 300 includes a cluster permission resolver 390, which may be implemented by any combination of hardware and/or software within a computing system. The cluster permission resolver 390 may receive inputs of user log data 360 and user cluster information 385.

User log data 360 includes data indicating, either directly or indirectly, permissions that have been utilized by users over a period of time. For instance, user log data 360 may include some or all of the same data as in user log data 160 and/or user log data 260, though user log data 360 may also or instead include other information.

User cluster information 385 is information identifying the users in a user cluster, such as a user cluster 285 or other group of users. In an embodiment, each identified user cluster 285 is inputted separately into cluster permission resolver 390 for separate analysis, though in some embodiments not all of the user clusters 285 need be analyzed.

In an embodiment, user cluster information 385 simply includes a list of users (e.g. a list of users whose feature vectors 275 were assigned to the user cluster 285). In another embodiment, user cluster information 385 actually includes feature vectors. In some such embodiments, the information in the user feature vectors may, for the purposes of subsystem 300, serve the same functions as user log data 360, and thus there may not need to be a separate input of user log data 360.

Cluster permission resolver 390 determines a set of permissions that have been used by the users in user cluster 385 over a period of time. The set of permissions may span the entire period of time for which user log data 360 stores data, or the user log data 360 may be filtered to a period of time. Cluster permission resolver 390 may do so in a variety of manners, depending on the nature of the user log data 360.

For example, the user log data 360 may store a separate entry logging each time a permission was used, and by whom. Cluster permission resolver 390 may look at all entries corresponding to users in the user cluster 385. The set of permissions is all permissions logged in those entries.

As another example, the user log data 360 may store a separate entry logging each time an operation was performed, as well as the user who requested the operation. Operations may include accessing an application or tool, or performing specific operations within the application or tool, depending on the embodiment. Cluster permission resolver 390 may look at all entries corresponding to users in the user cluster 385. For each operation that was performed at the request of a user in the cluster 385, cluster permission resolver 390 may determine the permission or permissions needed to perform the operation. The set of permissions is all permissions needed to perform any operation logged in the entries that correspond to users in the user cluster 385.

Cluster permission resolver 390 may then generate updated permission data 320 based on the set of permissions that have been used by the users in user cluster 385 over the period of time. For instance, in an embodiment, the updated permission data 320 may map the set of permissions to each user in the user cluster 385. As another example, the updated permission data 320 may map the set of permissions to a user group, and then map each user in the user cluster 385 to the user group.

In an embodiment, the cluster permission resolver 390 may output this updated permission data 320 to an access control mechanism, such as access control mechanism 110, directly via an API for updating permission data. Or, the cluster permission resolver 390 may output the updated permission data 320 as a file or database to replace, for instance, permission data 120.

The updated permission data 320 may, in an embodiment, take the form of instructions to add or remove permissions from the users in the user cluster 385. That is, instead of overwriting the existing permission data for a user, permissions may be added or removed individually for each user. Hence, two users within the user cluster 385 who begin with different permissions may not necessarily end up with the same set of permissions on account of the updated permission data 320.

In an embodiment, the instructions are to remove from each user in the user cluster 385 any permission that was not used by any user in the user cluster 385 over the period of time. Thus, for instance, consider a user 1 with permissions A, B, and C, and a user 2 with permissions B, C, D, and E. If both users are mapped to the same user cluster 385, and no user in the user cluster 385 has used permissions B or E within a recent period of time, the updated permission data 320 would include instructions to remove permissions B and E from all users in user cluster 385, and user 1 would end up with permissions A and C, while user 2 would end up with permissions A, C, and D.

In an embodiment, the instructions are to add to each user in the user cluster 385 any permission that was used by any user in the user cluster 385 over the recent period of time. Thus, for instance, consider again a user 1 with permissions A, B, and C, and a user 2 with permissions B, C, D, and E. If both users are mapped to the same user cluster 385, and one or more users in the user cluster 385 have used permissions E and F within a recent period of time, the updated permission data 320 would include instructions to add permissions E and F to all users in user cluster 385, and user 1 would end up with permissions A, C, E, and F, while user 2 would end up with permissions A, C, D, E, and F.

In an embodiment, an instruction to add a permission to each user in the user cluster 385 may only be generated for permissions that were utilized more than a threshold amount, or by more than a threshold number of users in the cluster 385. In an embodiment, instead of issuing individual instructions to add a set of permissions to each user in the user cluster 385, in embodiments where users may belong to more than one user group, a single instruction to create a user group having the set of permissions may be issued, along with instructions to add each user in the cluster 385 to the user group.

In an embodiment, cluster permission resolver 390 inputs existing permission data 318, and compares the existing permission data 318 for the users in user cluster 385 to the set of permissions that have been used by the users in user cluster 385. The cluster permission resolver 390 may utilize the comparison to determine whether or not to update specific permissions in the updated permission data 320.

For example, if a permission has not been used by any user in the user cluster 385 within a recent period of time, but the permission is one that a significant number of users in the user cluster 385 have, the cluster permission resolver 390 may be configured to generate updated permission data 320 that retains this permission. In fact, in an embodiment, the updated permission data 320 may even grant this permission to users within the user cluster 385 that do not have this permission. Conversely, if a permission has not been used by any user in the user cluster 385 within a recent period of time, but the permission is one that only one or a small number of users in the user cluster 385 have used, the permission may be removed from all users in the user cluster 385.

As another example, cluster permission resolver 390 may be configured to identify existing user group(s) to which of the users in user cluster 385 belongs. Cluster permission resolver 390 may then remove users in user cluster 385 from user group(s) that less than a threshold number of other users in the user cluster 385 do not belong. In an embodiment, if users in user cluster 385 are predominately in a certain user group, a user in user cluster 385 but not in the user group may be added to the user group (and optionally removed from any other user group to which the user belongs). Or, if users in a certain user group are predominately in another user cluster 385, any users in the current user cluster 385 that are assigned to the certain user group may be removed from the certain user group.

In an embodiment, the cluster permission resolver 390 may display or send a message or notification to a system administrator indicating the updated permission data 320 before actually sending the updated permission data 320 to the access control mechanism (or overwriting permission data 120). The system administrator may investigate the changes to determine whether they are actually desirable, make adjustments as necessary, and then have the cluster permission resolver 390 apply the adjusted updated permission data 320. Alternatively, instead of the cluster permission resolver 390 being configured to send the updated permission data 320 to the access control mechanism, the system administrator may make any changes deemed desirable manually.

In an embodiment the cluster permission resolver 390 may automatically apply certain updated permission data 320, but wait for interaction before applying other updated permission data 320. The specific types of updated permission data 320 for which changes may be made automatically may be determined based on, for instance, whether the quality of the specific cluster for which a change is being made is above some threshold score, the type of permission or permissions being updated, the role of the user or users being affected (e.g. a change to a system administrator or upper-level employee might require pre-approval), the number of users affected, and so forth.

In an embodiment, for certain clustering-based learning algorithms, a user may be assigned to more than one cluster 385. Consequently, decisions to remove or overwrite permissions for the user may require analysis of both clusters 385. For example, an analysis of one cluster 385 to which a user belongs may indicate that a permission X should be removed from the user, but upon analysis of another cluster 385 to which the user belongs, it may be determined that the permission X is used frequently within that cluster 385. Hence, a permission should be removed from the user only if it is one that has not been used by any user in any cluster 385 to which the user belongs.

3.0. Functional Overview

Figure 4:
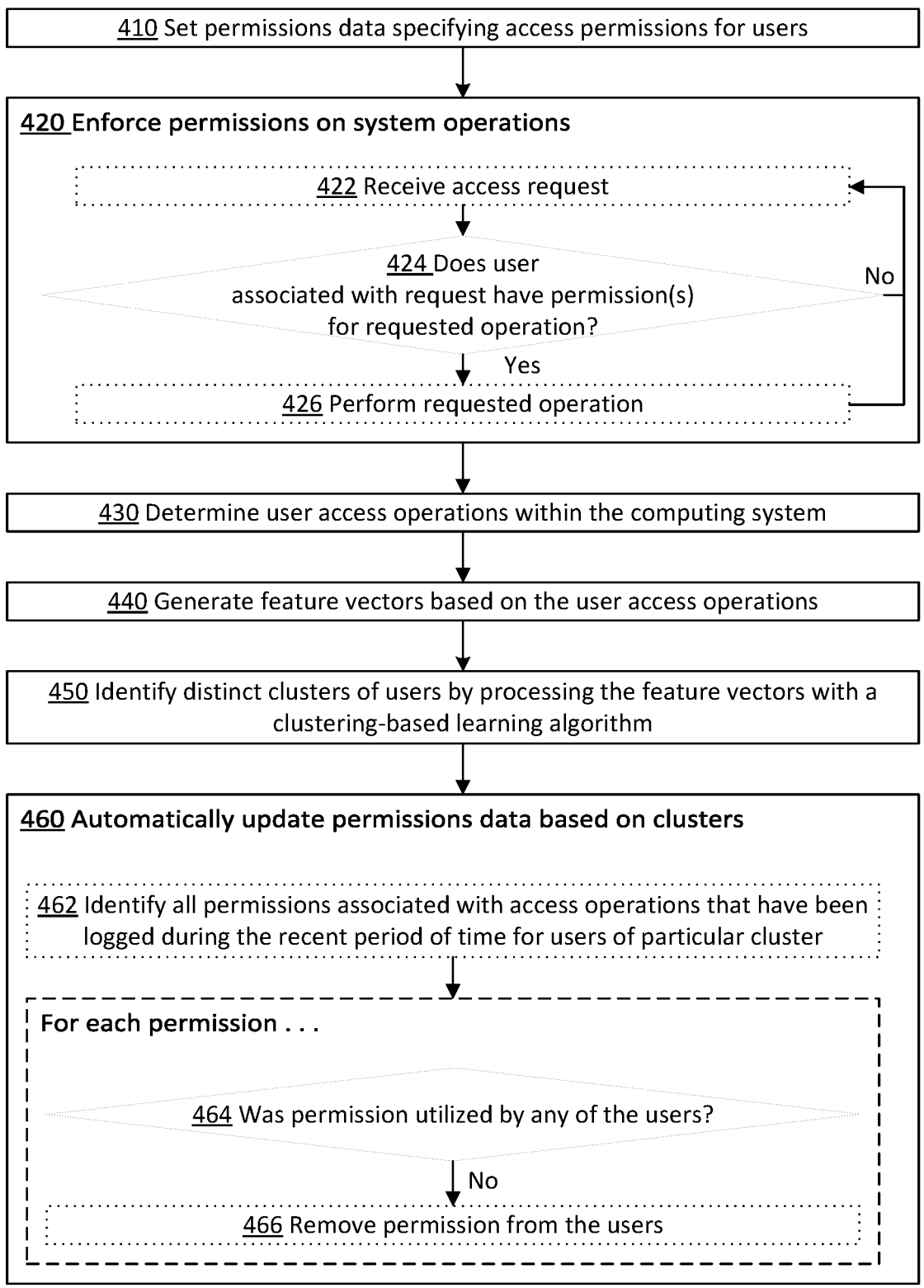
FIG. 4 illustrates an example flow for managing user permission data using clustering-based machine learning.

FIG. 4 illustrates an example flow 400 for managing user permission data using clustering-based machine learning, according to an embodiment. The various elements of flow 400 may be performed in a variety of systems, including systems such as systems 100, 200, and 300 described above. However, flow 400 may be performed in other systems as well. Nor should systems 100, 200, and 300 be construed as relying exclusively on flow 400 to provide the features described above.

In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 410 comprises setting permissions data specifying access permissions for users of a computing system, such as system 100. The permissions data maps user accounts to specific permissions. The permissions data may be, for example, user permissions data 120, or any other suitable permissions data. The mappings may be user-specific, or group-specific. In an embodiment, the permissions may be set via one or more interfaces of an access control mechanism that stores the permission data in a suitable form. In an embodiment, the permissions data may be written directly to an appropriate storage area, without the involvement of an access control mechanism. In at least one embodiment, block 410 may be performed at least partially as a result of previous iterations of flow 400.

Block 420 comprises enforcing the access permissions specified in the permissions data on system operations. Certain system operations may be mapped to certain access permissions. An operation may require, for example, that a user on whose behalf the operation is performed have one or more specific permissions, and these permissions may be different depending on the operation. For instance, an operation to read a file A might require one read permission, whereas an operation to read a file B might require another read permission.

Access permissions may be enforced in any suitable manner. In an embodiment, access permissions are enforced via interactions with a centralized access control mechanism, such as access control mechanism 110. In an embodiment, access permissions are enforced on an ad hoc basis, with various permission-enforcing applications and/or other subsystems accessing the permissions data as needed to determine which operations are permitted.

A non-limiting example method for enforcing access permissions is illustrated with respect to sub-blocks 422-426, which may be performed any number of times. Sub-block 422 comprises receiving an access request, such as an HTTP request for a certain URI, a file request, a command line instruction, or any other type of request. The request may be received via any suitable application logic of the implementing system.

Subblock 424 comprises determining whether a user associated with the access request, such as the user currently logged in to a client device from which the access request originated, has the requisite permissions to perform the requested operation. Several steps are implicit in this sub-block 424. First, the access operation or operations being requested by the access request must be determined, usually based on information in the request or associated with the request, such as a requested URI. This step may not be necessary where the operation is, in essence, to access the application logic. Second, the requisite permissions for the operation(s) must be determined. This may comprise, for instance, reading or requesting operations permission data. Third, it must be determined whether the user has the requisite permissions. These latter two steps may be performed by the application logic directly, or via an access control mechanism, depending on the embodiment. If the user has the requisite permissions, subblock 426 may be performed. Subblock 426 comprises performing the requested operation(s).

Returning to the main process flow 400, block 430 comprises determining user access operations that have been performed within the computing system. Block 430 may comprise, for instance, reading logs of access operations that have been performed in the computing system over a period of time, such as the last thirty days, six months, or any other suitable time frame. Such logs may have been generated using any suitable logging mechanism. For instance, in block 420, each time an access request is received, or each time an operation is performed, an entry recording the request or operation may be added to the log. The entry may further include a user associated with the request, a time, a URI, or any other suitable data.

Block 440 comprises generating feature vectors for users based on the user access operations. The users may be all of the users in the system, or a specific subset thereof. A feature vector is generated for each of the users. A feature vector may comprise a separate feature for each type of the access operations. The value of a feature may be a number equal to the number of times the corresponding access operation occurred over the period of time. Or, the value of a feature may be a binary value indicating whether or not the corresponding access operation occurred over the period of time. Or, the value of a feature may be a score calculated based on the frequency and/or recency with which the operation was performed for the user. In yet other embodiments, other types of feature vectors may be utilized, as described in other sections.

Block 450 comprises identifying distinct clusters of users by processing the feature vectors with a clustering-based learning algorithm. Any suitable clustering-based learning algorithm may be used, including without limitation k-modes clustering or k-means clustering. Generally, the clustering-based learning algorithm groups the feature vectors together in clusters based on similarity. The cluster identified for a user is the cluster in which the user's feature vector was placed.

In an embodiment, as described elsewhere, the clustering-based learning algorithm may be repeated a number of times with different parameters. A total score may be calculated for the set of clusters output in a given iteration, such as an average distance of each feature vector in each cluster from a defined center point for the cluster, or any other suitable score quantifying the quality of a set of clusters. The highest-scoring set of clusters may then be identified.

Block 460 comprises automatically updating the permissions data based on clusters. The permissions data may be updated in a variety of manners, depending on the embodiment. One such example is illustrated with respect to sub-blocks 462-466.

Subblock 462 comprises identifying all permissions associated with access operations that have been logged during the period of time for users of a particular cluster. This may comprise, for instance, identifying each access operation recorded for each user in the cluster. The user activity logs may be reanalyzed to determine this information, or in some embodiments the operations may be identified from the user feature vectors for the users within the cluster. Subblock 462 may further comprise looking up the requisite permissions for each access operation recorded for each user in the cluster. This may comprise, for instance, looking up or querying each recorded access operation in operations permission data.

Subblocks 464 and 466 are then performed for each permission in a set of permissions. The set of permissions may be all permissions in the system, or a subset of those permissions. In the case of a subset, the subset may be restricted to only those permissions currently held by a specific user of interest (e.g. a user whose permissions are being audited), by any user in a subset of users of interest, or by any user in the cluster, depending on the embodiment. The subset may also or instead be restricted to a set of automatically adjustable permissions. In this case, there may be other permissions that are not eligible to be updated automatically, and must instead be approved by a system administrator.

For each of the permissions, subblock 464 comprises determining whether the permission was utilized by any of the users in the cluster. In other words, subblock 464 comprises determining whether the permission was one identified in block 462. If not, then subblock 466 comprises removing the permission from some or all of the users, depending on the embodiment. Otherwise, the permission may be retained.

Flow 400 illustrates only one of many possible flows for managing user permission data. Other flows may include fewer, additional, or different elements, in varying arrangements.

For example, in some embodiments, the feature vectors may specify permissions that were used instead of operations that were executed. In such embodiments, various blocks of flow 400 would be modified to reflect the difference. For instance, block 430 would involve determining permissions used within the computing system (which may or may not involve determining the access operations). Block 440 would then comprise generating the feature vectors based on the permissions that were used, instead of access operations. Moreover, block 462 would involve simply identifying all permissions used by users of the particular cluster.

In an embodiment, different techniques may be used to enforce permissions on system operations in block 420, or to automatically update permission data based on the clusters in block 460. Examples of other suitable techniques are described, without limitation, in other sections of the disclosure.

4.0. Example Embodiments

Examples of some embodiments are represented, without limitation, in the following clauses:

According to an embodiment, a method comprises: setting permissions data specifying access permissions for users, the access permissions indicating access operations that the users are permitted to execute within a computing system; determining user access operations within the computing system; automatically updating the permissions data over time, the automatic updating including: generating feature vectors based on the user access operations, each of the feature vectors comprising values for a set of features, each of the features corresponding to a different access operation, each user having a separate feature vector whose values indicate specific access operations that have been logged for the user within the recent period of time; identifying distinct clusters of the users by processing the feature vectors with a clustering-based learning algorithm; adjusting the access permissions based on the distinct clusters.

According to an embodiment, a method comprises: setting permissions data specifying access permissions for users, the access permissions indicating access operations that the users are permitted to execute within a computing system; determining user access operations within the computing system; automatically updating the permissions data over time, the automatic updating including: generating feature vectors based on the user access operations, each of the feature vectors comprising values for a set of features, each of the features corresponding to a different access operation, each user having a separate feature vector whose values indicate specific access operations that have been logged for the user within the recent period of time; identifying distinct clusters of the users by processing the feature vectors with a clustering-based learning algorithm, the distinct clusters including a particular cluster of particular users; removing, from one or more of the particular users, a particular access permission that is not associated with any access operations that have been logged during the recent period of time for any of the particular users.

In an embodiment, automatically updating the permissions data over time further comprises reassigning a user from a first user group having first access permissions to a second user group having second access permissions that are different than the first access permissions based on the clustering-based learning algorithm identifying the user as belonging to a cluster associated with the second user group.

In an embodiment, a method further comprises: associating user groups with the distinct clusters; for each user group of the user groups, each user group being associated with a different distinct cluster: determining a set of permissions that have been utilized by users in the user group over the recent period of time; assigning the set of permissions to the user group; assigning a new user of the computing system to a first user group of the user groups.

In an embodiment, generating the feature vectors comprises setting a first value for a first feature in a first feature vector for a first user to a number of times that a first access operation corresponding to the first feature has been logged for the first user in the recent period of time.

In an embodiment, the access operations include accessing specific tools, each of the specific tools associated with a distinct set of the access permissions.

In an embodiment, a method further comprises: generating logs of the access operations, each entry of the logs identifying a uniform resource indicator ("URI"), a timestamp, and a user, each of the access operations having a different URI; maintaining permissions data that maps specific URIs to specific access permissions.

In an embodiment, the clustering-based learning algorithm is k-modes clustering.

According to an embodiment, a system comprises: access control logic configured to set permissions data specifying access permissions for users, the access permissions indicating access operations that the users are permitted to execute within a computing system; logging logic configured to determine user access operations within the computing system; clustering-based learning logic configured to: generate feature vectors based on the user access operations, each of the feature vectors comprising values for a set of features, each of the features corresponding to a different access operation, each user having a separate feature vector whose values indicate specific access operations that have been logged for the user within the recent period of time; identify distinct clusters of the users by processing the feature vectors with a clustering-based learning algorithm; cluster resolving logic configured to automatically update the permissions data over time based on the distinct clusters.

Other examples of these and other embodiments are found throughout this disclosure.

5.0. Implementation Mechanism-Hardware Overview

Figure 5:
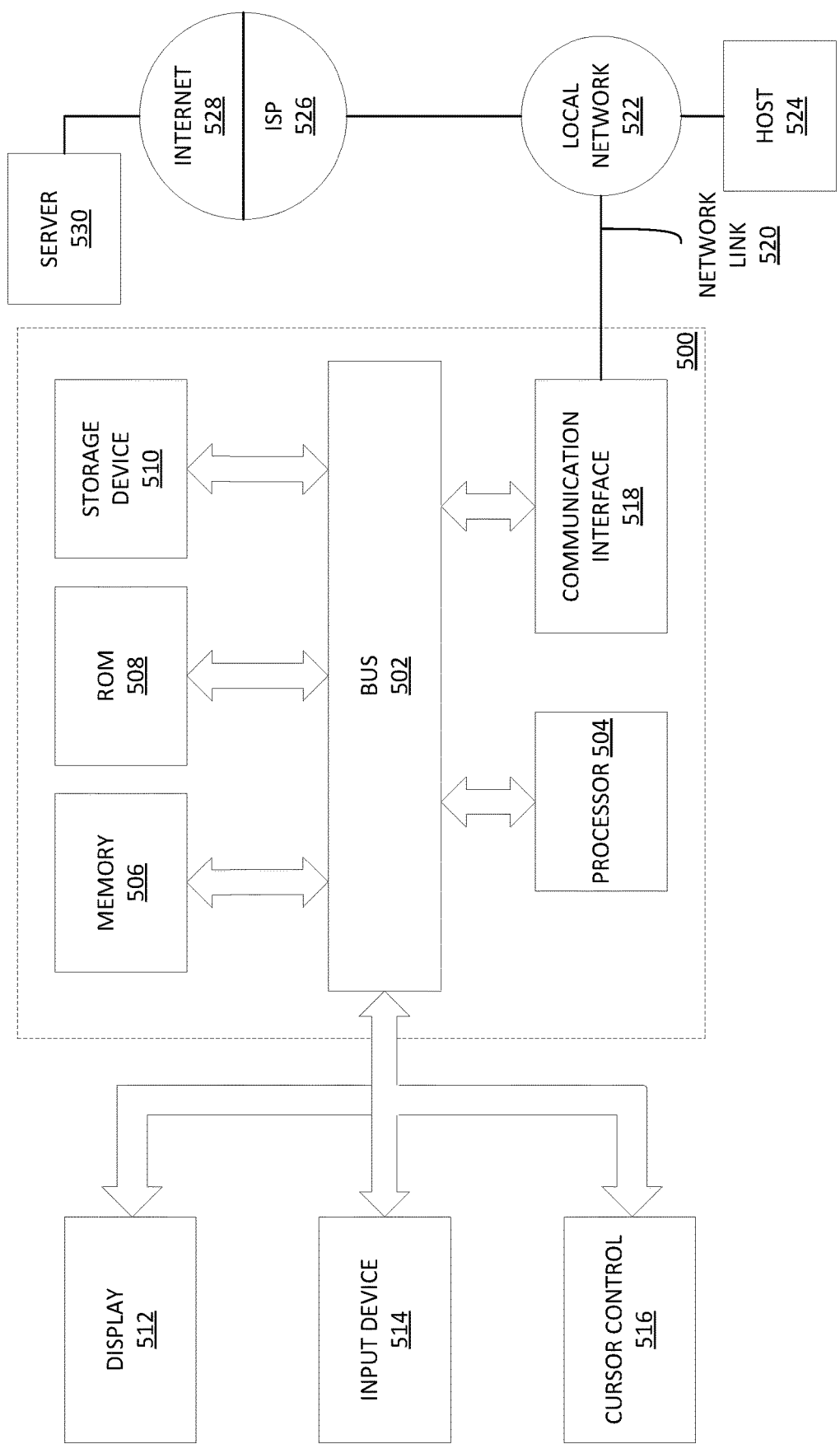
FIG. 5 is block diagram of a computer system upon which embodiments of the inventive subject matter may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing mainframe, multimedia device, handheld device, networking apparatus, or any other suitable device.

Computer system 500 includes one or more busses 502 or other communication mechanism for communicating information, and one or more hardware processors 504 coupled with busses 502 for processing information. Hardware processors 504 may be, for example, a general purpose microprocessor. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

In an embodiment, output to display 512 may be accelerated by one or more graphics processing unit (GPUs) in computer system 500. A GPU may be, for example, a highly parallelized, multi-core floating point processing unit highly optimized to perform computing operations related to the display of graphics data, 3D data, and/or multimedia. In addition to computing image and/or video data directly for output to display 512, a GPU may also be used to render imagery or other video data off-screen, and read that data back into a program for off-screen image processing with very high performance. Various other computing tasks may be off-loaded from the processor 504 to the GPU.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 506, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   setting permissions data specifying access permissions for users, the access permissions indicating access operations that the users are permitted to execute within a computing system;
   determining user access operations within the computing system;
   generating logs of access operations, a log of an access operation identifies a uniform resource indicator ("URI"), a user that performed the access operation, and a timestamp, each of the access operations having a different URI;
   maintaining permissions data that maps specific URIs to specific access permissions; and
   dynamically updating the permissions data on a periodic basis, the dynamic updating including:
      generating feature vectors based on the user access operations, the feature vectors comprising values for a set of features, different individual features in the set of features correspond to a different access operation, a feature vector is assigned to a unique user and includes values that indicate specific access operations that have been logged for the unique user within a recent period of time;
      identifying distinct clusters of the users by processing the feature vectors with a clustering-based learning algorithm, the distinct clusters including a cluster of particular users;
      determining a set of access permissions that are associated with access operations that have been logged during the recent period of time for the particular users; and removing, from one or more of the particular users, an access permission that is not in the set of access permissions.

2. The method of claim 1, wherein dynamically updating the permissions data over time further comprises reassigning a user from a first user group having first access permissions to a second user group having second access permissions that are different than the first access permissions based on the clustering-based learning algorithm identifying the user as belonging to a cluster associated with the second user group.

3. The method of claim 1, further comprising:
associating user groups with the distinct clusters;
for each user group of the user groups, each user group being associated with a different distinct cluster:
determining a set of permissions that have been utilized by users in the user group over the recent period of time;
assigning the set of permissions to the user group;
assigning a new user of the computing system to a first user group of the user groups.

4. The method of claim 1, wherein generating the feature vectors comprises setting a first value for a first feature in a first feature vector for a first user to a number of times that a first access operation corresponding to the first feature has been logged for the first user in the recent period of time.

5. The method of claim 1, wherein the access operations include accessing specific tools, each of the specific tools associated with a distinct set of the access permissions.

6. The method of claim 1,
wherein the access operation logs further identify information associated with an application or a file identifier.

7. The method of claim 1, wherein the clustering-based learning algorithm is k-modes clustering.

8. A system, including a processor and a memory coupled to the processor, comprising:
access control logic configured to set permissions data specifying access permissions for users, the access permissions indicating access operations that the users are permitted to execute within a computing system;
logging logic configured to determine user access operations within the computing system;
wherein the logging logic generates logs of access operations, a log of an access operation identifies a uniform resource indicator ("URI"), a user that performed the access operation, and a timestamp, each of the access operations having a different URI;
wherein the logging logic maintains permissions data that maps specific URIs to specific access permissions;
clustering-based learning logic configured to:
generate feature vectors based on the user access operations, the feature vectors comprising values for a set of features, different individual features in the set of features correspond to a different access operation, a feature vector is assigned to a unique user and includes values that indicate specific access operations that have been logged for the unique user within a recent period of time; and
identify distinct clusters of the users by processing the feature vectors with a clustering-based learning algorithm, the distinct clusters including a cluster of particular users; and
cluster resolving logic configured to dynamically update the permissions data on a periodic basis, the dynamic updating including:

determining a set of access permissions that are associated with access operations that have been logged during the recent period of time for the particular users; and
removing, from one or more of the particular users, a particular access permission that is not in the set of access permissions.

9. The system of claim 8, wherein dynamically updating the permissions data over time further comprises reassigning a user from a first user group having first access permissions to a second user group having second access permissions that are different than the first access permissions based on the clustering-based learning algorithm identifying the user as belonging to a cluster associated with the second user group.

10. The system of claim 8,
wherein the cluster resolving logic is further configured to:
associate user groups with the distinct clusters;
for each user group of the user groups, each user group being associated with a different distinct cluster:
determine a set of permissions that have been utilized by users in the user group over the recent period of time;
assign the set of permissions to the user group;
wherein the access control logic is further configured to assign a new user of the computing system to a first user group of the user groups.

11. The system of claim 8, wherein generating the feature vectors comprises setting a first value for a first feature in a first feature vector for a first user to a number of times that a first access operation corresponding to the first feature has been logged for the first user in the recent period of time.

12. The system of claim 8, wherein the access operations include accessing specific tools, each of the specific tools associated with a distinct set of the access permissions.

13. The system of claim 8,
wherein the access operation logs further identify information associated with an application or a file identifier.

14. The system of claim 8, wherein the clustering-based learning algorithm is k-modes clustering.

15. One or more non-transitory computer-readable media storing instructions that, when executed by one or more computing devices, cause:
setting permissions data specifying access permissions for users, the access permissions indicating access operations that the users are permitted to execute within a computing system;
determining user access operations within the computing system;
generating logs of access operations, a log of an access operation identifies a uniform resource indicator ("URI"), a user that performed the access operation, and a timestamp, each of the access operations having a different URI;
maintaining permissions data that maps specific URIs to specific access permissions; and
dynamically updating the permissions data on a periodic basis, the dynamic updating including:
generating feature vectors based on the user access operations, the feature vectors comprising values for a set of features, different individual features in the set of features correspond to a different access operation, a feature vector is assigned to a unique user and includes values that indicate specific access operations that have been logged for the unique user within a recent period of time;

identifying distinct clusters of the users by processing the feature vectors with a clustering-based learning algorithm, the distinct clusters including a cluster of particular users;

determining a set of access permissions that are associated with access operations that have been logged during the recent period of time for the particular users; and removing, from one or more of the particular users, an access permission that is not in the set of access permissions.

16. The one or more non-transitory computer-readable media of claim 15, wherein dynamically updating the permissions data over time further comprises reassigning a user from a first user group having first access permissions to a second user group having second access permissions that are different than the first access permissions based on the clustering-based learning algorithm identifying the user as belonging to a cluster associated with the second user group.

17. The one or more non-transitory computer-readable media of claim 15, wherein the instructions, when executed by the one or more computing devices, further cause:

associating user groups with the distinct clusters;

for each user group of the user groups, each user group being associated with a different distinct cluster:

determining a set of permissions that have been utilized by users in the user group over the recent period of time;

assigning the set of permissions to the user group;

assigning a new user of the computing system to a first user group of the user groups.

18. The one or more non-transitory computer-readable media of claim 15, wherein generating the feature vectors comprises setting a first value for a first feature in a first feature vector for a first user to a number of times that a first access operation corresponding to the first feature has been logged for the first user in the recent period of time.

19. The one or more non-transitory computer-readable media of claim 15, wherein the access operations include accessing specific tools, each of the specific tools associated with a distinct set of the access permissions.

20. The one or more non-transitory computer-readable media of claim 15, wherein the access operation logs further identify information associated with an application or a file identifier.

* * * * *